United States Patent
Cho

[19]

[11] Patent Number: 6,128,048

[45] Date of Patent: *Oct. 3, 2000

[54] CONVERGENCE CORRECTION APPARATUS FOR PROJECTION TELEVISION AND METHOD THEREOF

[75] Inventor: Jin Lyeol Cho, Kyungsangbook-Do, Rep. of Korea

[73] Assignee: LG Electronics, Inc., Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/770,159

[22] Filed: Dec. 19, 1996

[30] Foreign Application Priority Data

Dec. 19, 1995 [KR] Rep. of Korea ...................... 95-51999

[51] Int. Cl.[7] ...................................................... H04N 9/28
[52] U.S. Cl. ........................ 348/745; 348/806; 348/807; 348/704; 348/744; 315/368.11; 315/368.12
[58] Field of Search .................................. 348/744, 745, 348/806, 180, 184, 189, 190, 704, 561, 807, 746, 805; 315/368.11, 368.12, 368.13, 368.18

[56] References Cited

U.S. PATENT DOCUMENTS

| | | | |
|---|---|---|---|
| 5,303,044 | 4/1994 | Richards | 348/704 |
| 5,345,280 | 9/1994 | Kimura | 348/745 |
| 5,627,605 | 5/1997 | Kim | 348/745 |
| 5,671,025 | 9/1997 | Ryu | 348/745 |
| 5,694,181 | 12/1997 | Oh | 348/807 |
| 5,751,122 | 5/1998 | Park | 315/368.16 |
| 5,781,244 | 7/1998 | Hirose | 348/704 |

*Primary Examiner*—Mark R. Powell
*Assistant Examiner*—Wesner Sajous
*Attorney, Agent, or Firm*—Ostrolenk, Faber, Gerb & Soffen, LLP

[57] ABSTRACT

An improved convergence correction apparatus for a projection television and a method thereof which are capable of moving a convergence correction data corresponding to modes to a memory during a mode switching without increasing the capacity of the memory in a projection television, so that it is possible to fabricate a more compact system, for thus reducing the fabrication cost. The apparatus for a projection television according to the present invention includes apparatus for cleansing a semiconductor wafer which includes an EEPROM for storing a correction data corresponding to a picture mode, a microcomputer for reading a correction data stored in an EEPROM (Electrically Erasable and Programmable Read Only Memory) in accordance with a picture mode selection signal from a picture mode judging unit when externally receiving a mode switching signal therein and for transferring the data for a predetermined time, a first switch connected to an address generator and an input terminal of the memory, a second switch connected to an output terminal of the memory, and a read/write controller for switching the first and second switches at high speed, outputting the correction data stored in the memory to a digital/analog converter in accordance with an address from the address generator, and storing the correction data from the microcomputer into the memory.

2 Claims, 6 Drawing Sheets

WIDE PICTURE

FIRST ZOOM

SECOND ZOOM

CONVERGENCE CORRECTION APPARATUS FOR PROJECTION TELEVISION AND METHOD THEREOF

BACKGROUND OF THE INVENTION

1. Field of the Invention

The present invention relates to a convergence correction apparatus for a projection television and a method thereof, and in particular to an improved convergence correction apparatus for a projection television and a method thereof which are capable of moving convergence correction data corresponding to modes to a memory during mode switching without increasing the capacity of the memory in a projection television, so that it is possible to fabricate a more compact system, thus reducing the fabrication cost.

2. Description of the Conventional Art

In the projection television using a red, green, blue CRT, a correction data with respect to the entire portion of a screen is stored in a memory so as to correct a misconvergence phenomenon due to different light incident angles. The thusly stored correction data is read in synchronization with a raster scanning, and then is changed into an analog signal for correcting the misconvergence.

With the above-described method, it was known to increase the reliability of the picture and reduce an adjusting time. However, this method has disadvantages in that the price is higher than the conventional analog dependent convergence method which uses a passive device such as a resistor, coil, and a condenser, and when the deflection is changed, the convergence must be re-corrected.

For example, it is possible to provide various picture size modes which are obtained by adjusting the aspect ratio of a picture such as a vistar, cinema, panavision, ultra scan, etc. so that a user can enjoy more dynamic pictures as shown in FIG. 1A. Here, only the zoom modes as shown in FIGS. 1B and 1C are illustrated as examples.

FIG. 1D is a diagram illustrating an inclination of a deflection current. Namely, the deflection level is increased in accordance with the inclination of the deflection current, and thus the picture size is increased, so that the data to be corrected is increased. The correction amount of the convergence is increased from the center portion toward the edge portions thereof. In addition, the convergence must be corrected based on the changing picture size.

FIG. 2 is a block diagram illustrating a conventional digital convergence correction apparatus.

As shown therein, the conventional digital convergence correction apparatus includes a PLL unit 201 for generating a clock in synchronization with raster scan synchronous signals HBLK and VBLK inputted, an address generator 202 for receiving the clock from the PLL unit 201 and for outputting an address signal "addr", an adjusting pattern and adjusting point indication generator 203 for outputting an adjusting pattern and adjusting point indication in accordance with the address signal from the address generator 202, a memory 204 for outputting a correction data corresponding to the address signal from the address generator 202, a digital/analog (D/A) converter 205 for converting the correction data from the memory 204 into an analog signal, a low-pass filter 206 for filtering the analog signal from the D/A converter 205, an amplifier 207 for amplifying the analog signal filtered by the low-pass filter 206 and for supplying a high current to a yoke CY, an EEPROM (Electrically Erasable and Programmable Read Only Memory) 208 for storing the adjusting point data of a picture, and a microcomputer 209 for reading the adjusting point data stored in the EEPROM 208, computing the convergence, and storing the computed result into the memory 204.

The operation of the conventional digital convergence correction apparatus will now be explained with reference to the accompanying drawings. The address generator 202 outputs the address signal "addr" to the memory 204 in accordance with the clock outputted from the PLL unit 201. The memory 204 stores the data computed by the microcomputer 209 and outputs the data corresponding to the address signal "addr" from the address generator 202 to the D/A converter 205. The D/A converter 205 converts the inputted data into an analog signal, and the thusly converted analog signal is amplified by the amplifier 207, and the thusly amplified signal is transmitted to the convergence yoke CY.

Therefore, the high current is applied to the convergence yoke CY, and the magnetic field is changed, for thus correcting the misconvergence.

Conventionally, since the EEPROM 208 stores only adjusting data of the picture, the memory 204 stores a convergence correction data with respect to the entire portion of the picture by using only a few Kbit, and the memory 204 has much capacity.

FIG. 3 is a block diagram illustrating a conventional convergence correction apparatus adapted to a projection television.

As shown therein, the correction data based on a mode is stored in the memory 303 and the EEPROM 307. Namely, the microcomputer 308 computes the correction data with respect to a corresponding mode when the power is on, and inputs the memory address of the corresponding mode. Namely, a user can enjoy the picture after the correction data is inputted. The microcomputer 308 judges the output signal from the picture mode judging unit 309, and outputs an address conversion signal AC to the address generator 301, and the address of the corresponding mode is supplied to the memory 303.

Therefore, the correction data corresponding to the picture mode is converted into a correction waveform of analog through the D/A converter 305 and the low-pass filter 306. During fabrication, the correction is performed with respect to a corresponding mode, so that the adjusting point data is stored in the address corresponding to the EEPROM 307.

However, when the microcomputer 308 outputs the correction data to the memory 303, the switches 302 and 304 are switched to fixed terminals y and y'. Therefore, since the correction data from the memory 303 is not outputted to the D/A converter 305, there are displayed abnormal pictures in the intervals "a" and "c" as shown in FIG. 4.

In addition, in the conventional convergence correction apparatus, since there must be additionally provided memories based on the mode of the picture, if the number of modes is increased, a larger capacity of memory is needed, for thus increasing the fabrication cost. In addition, it is impossible to enjoy the pictures until the correction data with respect to a corresponding mode is computed based on the adjusting point data, and is stored into the memory 303. In order to shorten this duration time, if the high speed microcomputer 308 is used, the microcomputer 308 does not work during a usual operation, thereby degrading the efficiency of the system.

SUMMARY OF THE INVENTION

Accordingly, it is an object of the present invention to provide a convergence correction apparatus for a projection television and a method thereof which overcome the problems encountered in the conventional art.

It is another object of the present invention to provide a convergence correction apparatus for a projection television and a method thereof which are capable of moving a convergence correction data corresponding to modes to a memory during a mode switching without increasing the capacity of the memory in a projection television, so that it is possible to fabricate a more compact system, for thus reducing the fabrication cost.

To achieve the above objects, there is provided a convergence correction apparatus for a projection television according to the present invention which includes apparatus for cleansing a semiconductor wafer which includes an EEPROM for storing a correction data corresponding to a corresponding picture mode, a microcomputer for reading a correction data stored in an EEPROM (Electrically Erasable and Programmable Read Only Memory) in accordance with a picture mode selection signal from a picture mode judging unit when externally receiving a mode switching signal therein and for transferring the data for a predetermined time, a first switch connected to an address generator and an input terminal of the memory, a second switch connected to an output terminal of the memory, and a read/write controller for switching the first and second switches at high speed, outputting the correction data stored in the memory to a digital/analog converter in accordance with an address from the address generator, and storing the correction data from the microcomputer into the memory.

To achieve the above objects, there is provided a convergence correction method for a projection television according to the present invention which includes apparatus for cleansing a semiconductor wafer which includes the steps of a first step for reading a convergence correction data corresponding to a wide picture when an electric power is supplied to a projection television, transferring the data to a memory through a read/write controller, and preparing a convergence correction data corresponding to a first zoom picture, a second step for transferring the convergence correction data generated in the first step to the memory through the read/write controller for a predetermined time in accordance with a mode switching signal inputted, and preparing the convergence correction data corresponding to a second zoom picture, and a third step for transferring the convergence correction data generated in the second step to the memory through the read/write controller for a predetermined time in accordance with a mode switching signal inputted, and preparing the convergence correction data corresponding to a wide picture.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus do not limit the present invention, and wherein:

FIGS. 1A through 1D are views illustrating a picture based on a deflection current amount in the conventional art, of which:

FIG. 1A is a diagram illustrating a wide picture;

FIGS. 1B and 1C are diagrams illustrating a picture in a zoom mode with respect to the side picture; and FIG. 1D is a diagram illustrating an inclination of a deflection current;

DETAILED DESCRIPTION OF THE INVENTION

Figure 5:
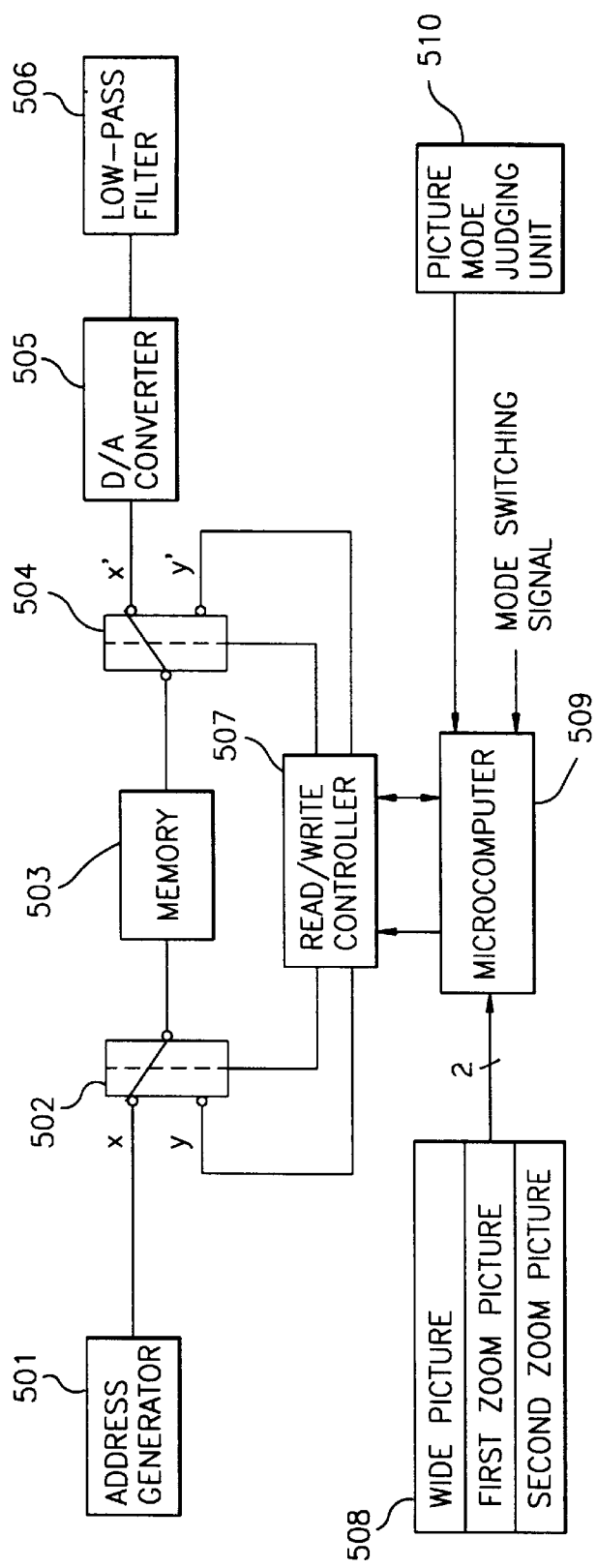
FIG. 5 is a block diagram illustrating a convergence correction apparatus for a projection television according to the present invention.

FIG. 5 is a block diagram illustrating a convergence correction apparatus for a projection television according to the present invention.

As shown therein, the convergence correction apparatus for a projection television according to the present invention includes an EEPROM (Electrically Erasable and Programmable Read Only Memory) 508 for storing a correction data corresponding to a picture mode, a microcomputer 509 for reading the correction data stored in the EEPROM 508 in accordance with a picture mode selection signal from a picture mode judging unit 510 when a mode switching signal is externally inputted and for transmitting the signal for a predetermined time, and a read/write controller 507 for switching switches 502 and 504 and connected to input/output terminals of a memory 503 at high speed, for outputting the correction data stored in the memory 503 to a D/A (Digital/Analog) converter 505 in accordance with an address from an address generator 501, and for storing the correction data received from the microcomputer 509 into the memory 503.

The construction of the convergence correction apparatus for a projection television according to the present invention will now be explained with reference to FIGS. 6 through 9.

Figure 1A:
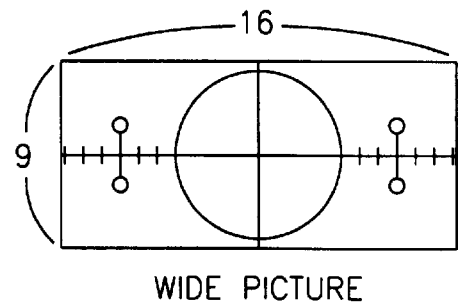
Figure 1B:
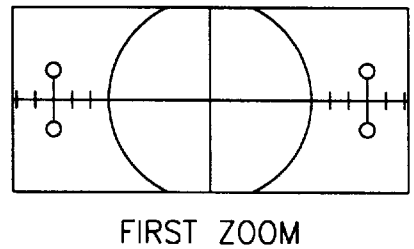
Figure 1C:
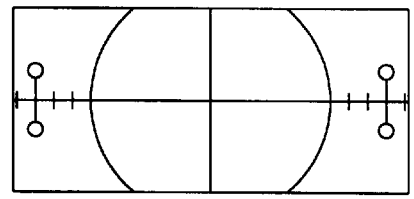
Figure 1D:
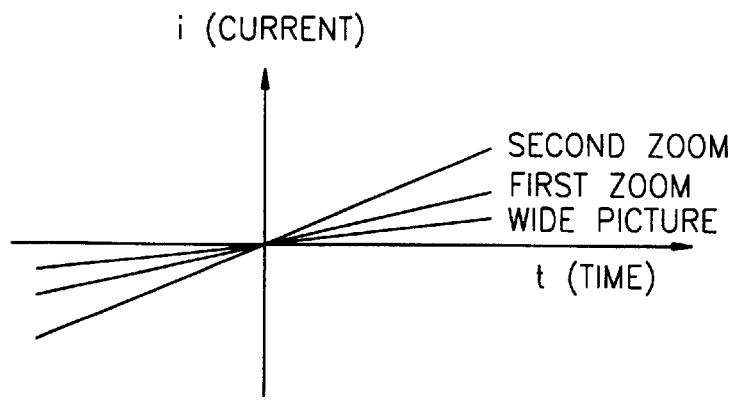
Figure 2:
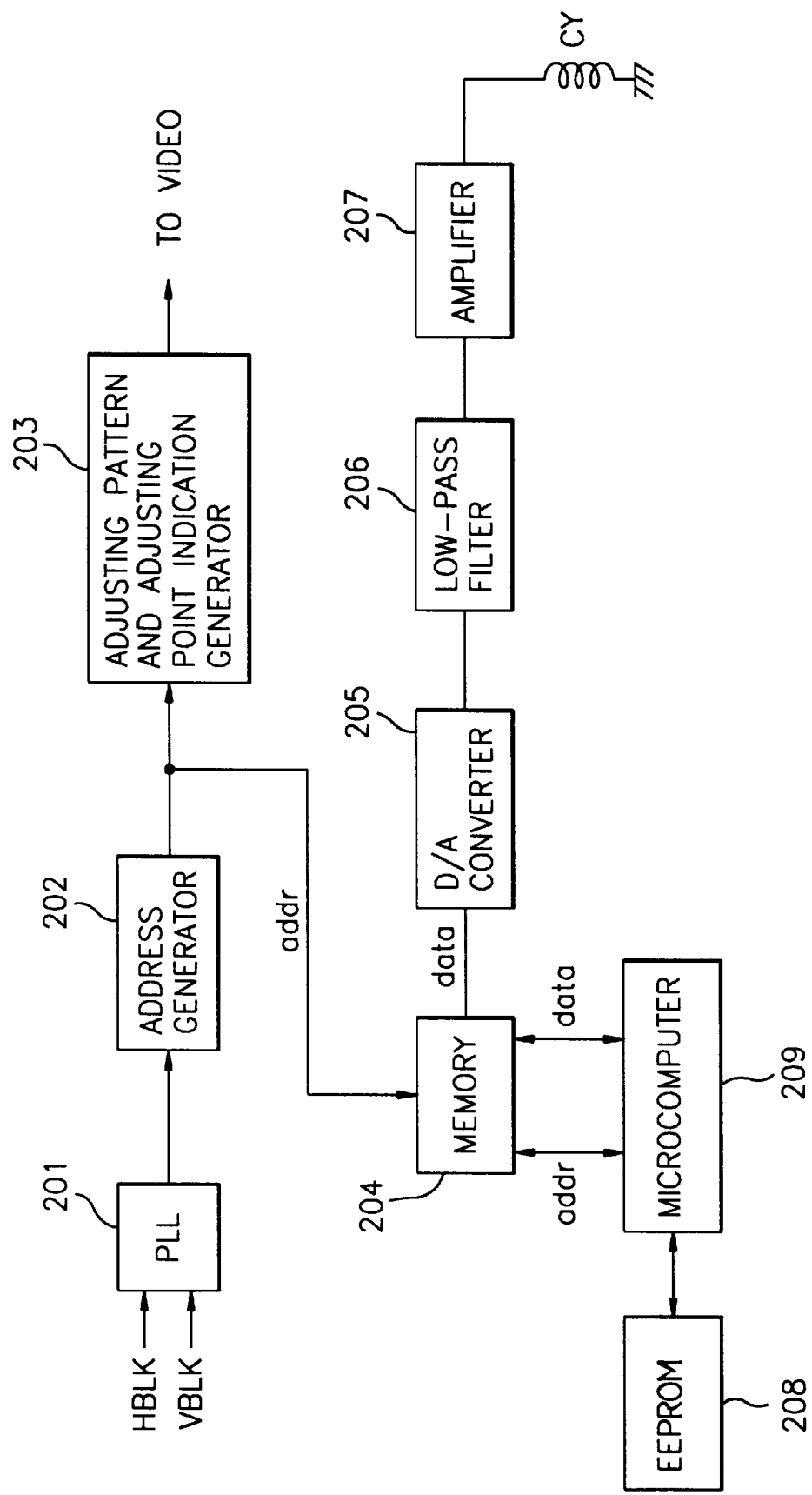
FIG. 2 is a block diagram illustrating a conventional digital convergence correction apparatus.
Figure 3:
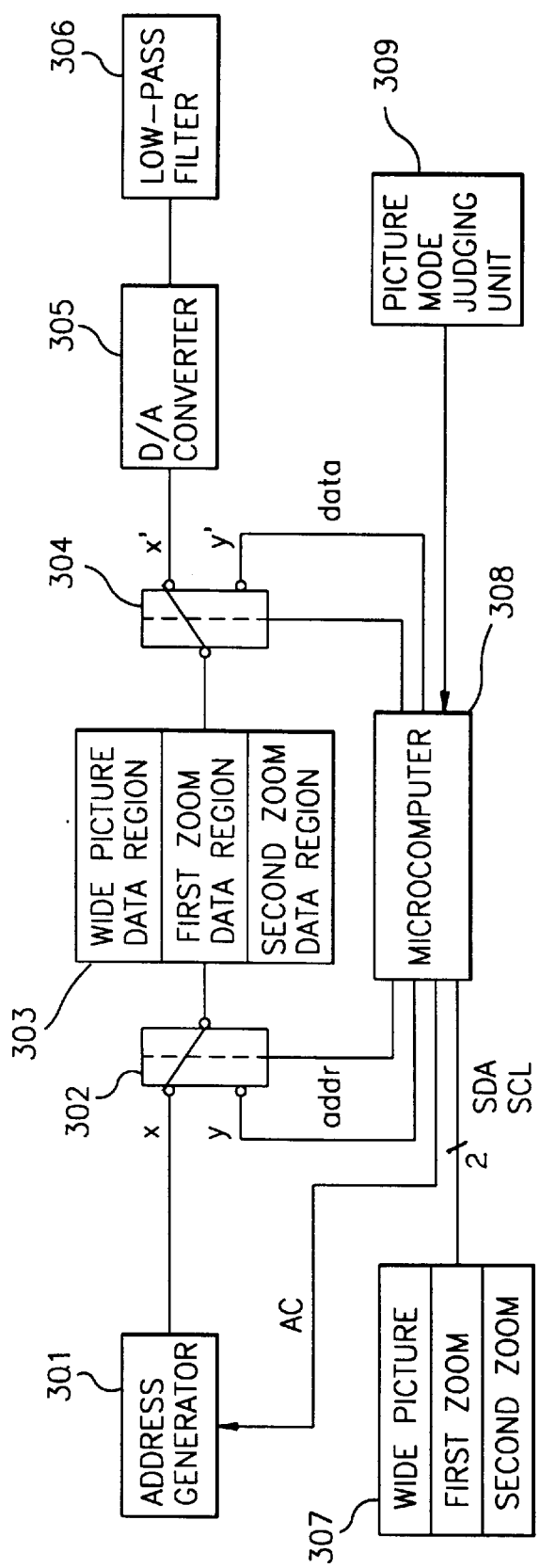
FIG. 3 is a block diagram illustrating a conventional convergence correction apparatus adapted to a projection television.
Figure 4:
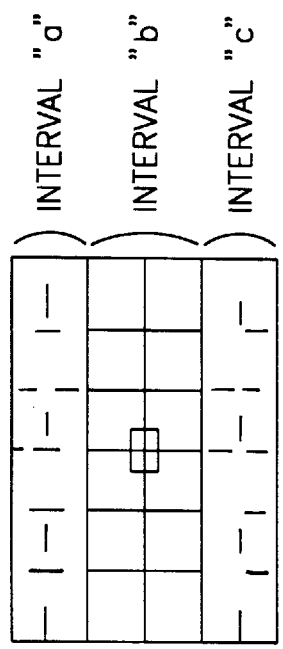
FIG. 4 is a diagram illustrating a picture at the time when a correction data is transmitted based on a convergence correction apparatus of FIG. 3.

When the switches 502 and 504 are switched to the fixed terminals y and y' so that the microcomputer 509 outputs the correction data to the memory 503 through the read/write controller 507, the correction data stored in the memory 503 is not transmitted to the D/A converter 505, and there are displayed abnormal pictures within the intervals "a" and "c" as shown in FIG. 4. In order to overcome the above-described problems, the switching operation of the switches 502 and 504 are performed at high speed.

Actually, in the case of the NTSC-M method (a horizontal frequency: 15.734, 63 $\mu s$), there are sixteen adjusting points on one horizontal scanning line. If the correction data is 8 bytes with respect to one adjusting point, the address time is 496 ns (63.5 $\mu s$/16×8=496 ns) which relates to 2 Mhz.

However, since the memory 503 of 25–150 ns for a reading/writing operation is generally used, when switching the switches 502 and 504 at high speed, the microcomputer 509 can read from and write into the memory 503 without affecting the correction data output of an actual picture.

Figure 7A:
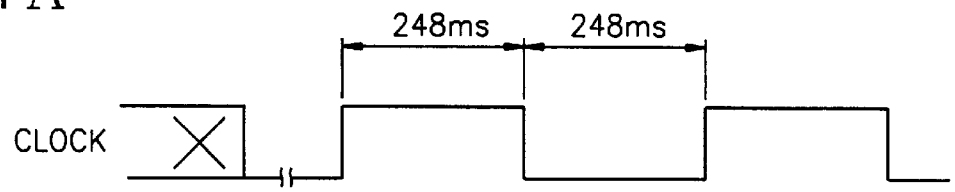
FIGS. 7A and 7B are diagrams illustrating a convergence correction data transmission timing according to the present invention.
Figure 7B:
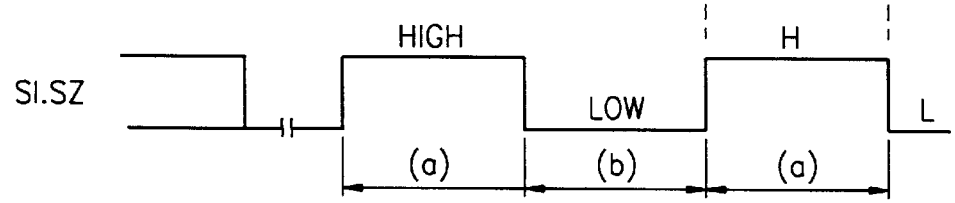

As shown in FIGS. 7A and 7B, the microcomputer 509 divides the address time interval into two intervals: an interval "a" and an interval "b".

Figure 6:
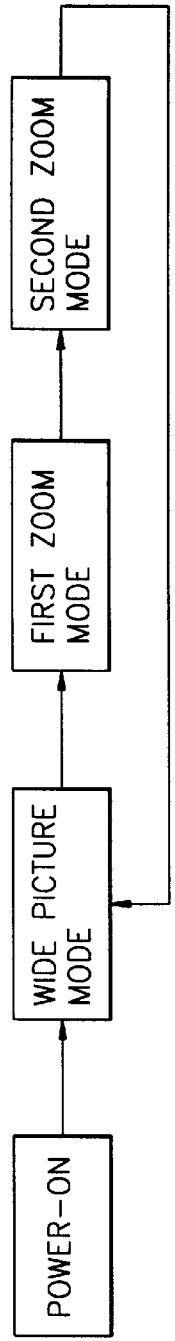
FIG. 6 is a block diagram illustrating a picture mode switching according to the present invention.

In the interval "a", the microcomputer 509 outputs a low level switching control signal, so that the read/write controller 507 can switch the switches 502 and 504 to the terminals y and y'. Here, the microcomputer 509 can transfer the convergence correction data read from the EEPROM 508 to the memory 503 in accordance with the picture mode judged by the picture mode judging unit 510. The picture mode can be converted into the mode as shown in FIG. 6 in accordance with a mode switching signal.

When the microcomputer 509 receives the mode switching signal by judging whether the mode switching signal is inputted, the output signal from the picture mode judging unit 510 is detected. Thereafter, the microcomputer 509 reads the correction data corresponding to the detected picture mode from the EEPROM 508, and transmits the correction data to the memory 503. Actually, it is impossible to transmit the correction data corresponding to the entire picture for a picture mode time (400–500 Ms) during a mode switching operation because the processing speed of the microcomputer 509 is slower than the data processing speed between the memory 503 and the read/write controller 507.

Namely, in the case that the correction data of one byte is transmitted to the memory 503 at every 500 ns, and the capacity of the memory 503 is 32Kbytes, 16 Ms ($32 \times 10^3 \times 500 \times 10^{-9} \approx 16$ Ms) is needed. Therefore, it is impossible to obtain 16 Ms due to the operation of the microcomputer 509.

Figure 8A:
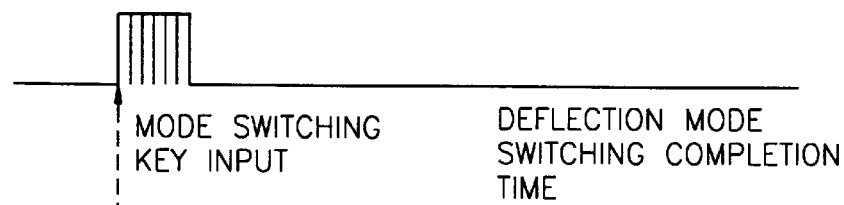
FIGS. 8A through 8C are views illustrating timing with respect to a mode switching signal, a picture mute signal, and a correction data according to the present invention.
Figure 8B:
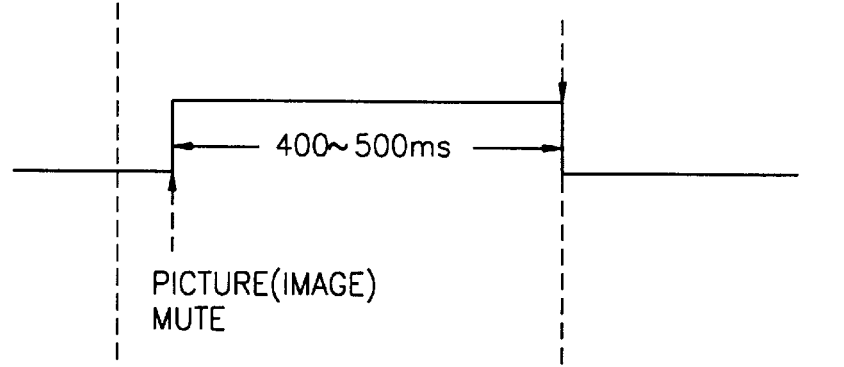
Figure 8C:
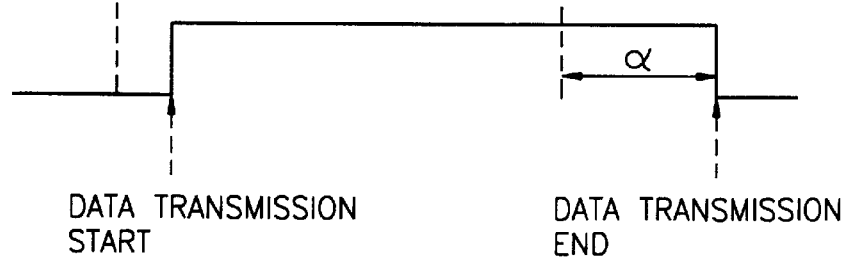

Therefore, as shown in FIGS. 8B and 8C, after the picture mute signal is shifted to a low level, the convergence data is continuously transmitted to the read/write controller 507 through the memory 503 for a predetermined time "α". Here, when the picture mode is switched, the deflection is changed. The convergence of the portion in which the correction data is not transmitted appears distorted. The user can not sense this distortion.

However, in contrast with the switching order of the picture mode as shown in FIG. 6, when the picture mode is changed from the wide picture mode to a second zoom mode, and the deflection level is high, and the picture appears more distorted. However, when the picture mode is switched in the order shown in FIG. 6, the deflection is slightly changed, so that the user can not sense the misconvergence. In particular, as shown in FIG. 8C, once the transmission of the correction data is completed, the correction data corresponding to the picture mode is outputted, so that the misconvergence does not occur.

Figure 9:
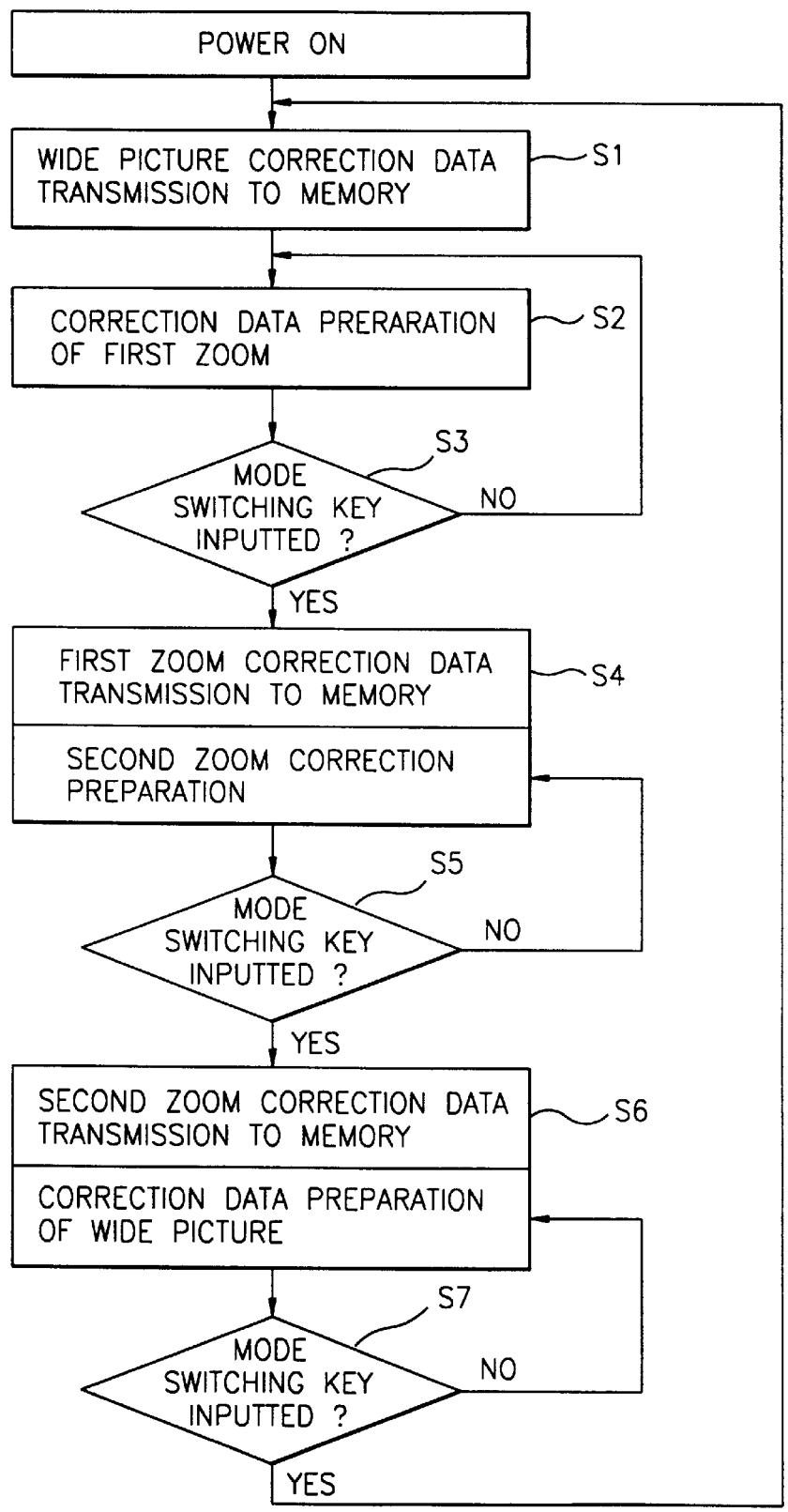
FIG. 9 is a flow chart illustrating a convergence correction method for a projection television according to the present invention.

As shown in FIG. 9, in the present invention, after the picture mute is terminated, the correction data is prepared so as to minimize the time "α" during which the correction data is outputted. Namely, the microcomputer 509 reads the correction data corresponding to the next picture mode from the corresponding address of the EEPROM 508, performs an operation, and stores the data. In addition, after the picture mode is switched, the microcomputer 509 transmits the data to the memory 503.

In another embodiment of the present invention, the EEPROM 508 is directed to storing the amount of data as much as changed correction data of the first zoom and second zoom from the correction data of the wide picture mode which is a basic picture mode so as to reduce the transmission data amount and the capacity of the EEPROM 508.

Namely, even when the deflection size is increased or decreased, the center portion of the picture as shown in FIG. 1 is not changed. There is only a convergence problem in the periphery of the picture. Therefore, in the other picture modes, only the portion changed is stored in the EEPROM 508 based on the correction data of the wide picture, for thus reducing the amount of data to be transmitted to the memory by the microcomputer 509. This method is to minimize the time "α" as shown in FIGS. 8A through 8C.

As described above, the convergence correction apparatus for a projection television and a method thereof according to the present invention is directed to moving the convergence correction data corresponding to a mode to the memory during the mode switching without increasing the capacity of the memory in the projection television and which is directed to adjusting the raster scanning by using the deflection, so that it is possible to fabricate a more compact system, thus reducing the fabrication cost. In addition, the present invention is directed to using the misconvergence which the user can not sense, and enhancing the efficiency of the system by using the microcomputer in the usual mode.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A convergence correction data transmitting method for a projection television, for reading corresponding correction data stored in an EEPROM and transmitting said corresponding correction data to a memory through a read/write controller by use of a microcomputer, the method comprising the steps of:

a first step including preparing a first zoom correction data after reading a wide picture correction data and transmitting the first zoom correction data to the memory when a power on condition is detected; and a second step comprising detecting if a mode change key has been inputted, transmitting said first zoom data to the memory at a picture mute starting time and preparing said wide picture correction data.

2. The method of claim 1, wherein said first zoom correction data is said wide picture correction data or a second zoom correction data is a changed version of said first zoom correction data.

* * * * *